Nov. 4, 1969 W. A. MUNSON 3,476,268

BLAST FURNACE VOLUME CHARGING CONTROL

Filed July 27, 1967

WITNESSES:
Bernard R. Gieguey
James H. Young

INVENTOR
William A. Munson
BY E. F. Possessky
ATTORNEY

United States Patent Office 3,476,268
Patented Nov. 4, 1969

3,476,268
BLAST FURNACE VOLUME CHARGING
CONTROL
William A. Munson, Williamsville, N.Y., assignor to
Westinghouse Electric Corporation, Pittsburgh,
Pa., a corporation of Pennsylvania
Filed July 27, 1967, Ser. No. 656,487
Int. Cl. B65g 69/00; G01g 13/00
U.S. Cl. 214—2                                    7 Claims

ABSTRACT OF THE DISCLOSURE

Blast furnace charge material is transported to the furnace small bell and in turn to the furnace large bell and the furnace body under volume control. The volume control directs predetermined weights and charging patterns of materials to the furnace, and in doing so it effects an optimally low number of bell operations in response to detected volume of charge material inflow.

Background of the invention

The present invention relates to material handling systems and more particularly to charging control systems for ironmaking blast furnaces.

In the operation of a blast furnace, various materials are processed to produce molten iron and usable or salable by-products including slag and blast furnace gas. The principal materials charged into the furnace are fluxing agents such as limestone or dolomite, carbon containing materials such as coke, iron containing materials such as ore, and/or carbon and iron containing materials such as sinter or pellets. Other materials such as scrap, water, additives, etc. may also be included in the charge.

Typically, a blast furnace lining has a useful life of 4 to 6 years and the furnace is operated on a batch basis during that period. The furnace batching operation is continuous except for shutdown periods required for bell seal or other repairs. Thus, during the batching operation, successive batches of charge materials are supplied through the furnace top on a continuing basis in order to maintain an appropriate burden level as batches of hot metal and slag are removed from the furnace body from time to time. The charge amounts of materials are preselected substantially to maintain the ironmaking process in thermal and chemical balance, i.e., to enable the production of hot metal with specified endpoint chemistry and temperature, blast furnace gas with minimum B.t.u. content required for fuel use, and slag with the chemistry required for salability.

A skip hoist system is presently the most common means employed for transporting charge materials to the top of a blast furnace. Typically, the skip hoist system cars carry material to the furnace top in a preselected sequence of unit car loads during the batching charge operation. For example, the unit car loads may in sequence contain ore, coke, coke, ore, stone, coke, coke, ore, coke, coke, etc.

In conventional practice, a skip car has a capacity of about 300 to 400 cubic feet while the small bell hopper at the furnace top has a capacity of about 600 to 700 cubic feet. The small bell is operated to dump its load into the large bell after each full skip car delivery of a unit load of material. The fact of the skip car delivery of a unit load is thus the conventional basis upon which the small bell is operated.

The large bell hopper might have a capacity of about 1700 cubic feet and, after a maximum number of small bell dumps, it is operated to dump its load into the body of the blast furnace. As in the case of small bell operation, the conventional large bell operation depends on counting unit loads, i.e., the number of small bell dumps. Repeat batch operations of the small and large bells are effected until the burden within the furnace substantially acquires a level within the preselected level range.

Conveyor belt systems are also employed to transfer materials to the top of a blast furnace. These systems primarily differ from skip hoist systems in the mechanical means, i.e., a network of belts, which is used to transport the charge material to the furnace top. However, as in the case of the skip car system, unit loads of material are conventionally delivered in a preselected sequence to the furnace top. In this case, a unit load is formed by conveyor scale weighing, as opposed to filling a skip car from a hopper supply of weighted material. A typical conveyor transport sequence might be coke, sinter, stone blend (including additives), coke, etc. After each unit conveyor load is delivered, the small bell is dumped and after a maximum number of small bell dumps the large bell is dumped. Thus, although some flexibility is gained in choice of the weight of unit loads, the conventional basis for small and large bell dumping in the conveyor system nonetheless is the delivery of one or more unit loads as in the case of the skip hoist systems.

The frequency with which the furnace top bells are operated directly affects furnace productivity and furnace downtime. More particularly, a seal is employed at the base of each bell in order to maintain furnace top pressure and flow of process gas product through the downcomer conduit. A small portion of the blast furnace gas, after it has been cleaned, is directed into the large bell hopper space to produce large bell pressure which aids the bell seal in maintaining furnace top pressure. Material within the large bell hopper also aids in the sealing action.

Each time the small bell is operated, some large bell gas is lost to the atmosphere. The extent of loss depends upon the extent to which the large bell space is controllably depressurized, if at all, prior to small bell dumping. Net large bell gas loss is made up by new clean gas inflow and to some extent by leakage flow of unclean gas directly from the furnace top. In any event, each small bell operation represents a direct loss of blast furnace gas which could be used more productively elsewhere.

Each time the small bell or the large bell is dumped, some bell seal wear or cutting is produced by the sliding and scraping friction caused by bell hopper wall movement against the seal and by the sliding and scraping friction and impact action against the seal caused by falling material. As a consequence, the bell seals become increasingly leaky with use and thereby cause increasing consumption of clean gas for bell pressure maintenance. When the bell seals become excessively leaky, a safety hazard is created because of the combustible and toxic properties of the escaping blast furnace gas. Accordingly, at some point in the bell seal life as determined by gas cost and safety risk considerations, it becomes necessary to shut the blast furnace down and replace the bell seals.

With increasing bell operating frequency, furnace productivity is adversely affected since bell operating gas loss, bell seal wear and associated gas leakage, and furnace down time all increase.

The bell opening time including dwell time and pressurizing and depressurizing time increases with increasing bell operating frequency and accordingly further adversely affects furnace productivity and efficiency.

Minimum small and large bell operating frequencies are restricted in all cases by furnace space limitations on bell and bell hopper size, and in the case of the prior art the minimum bell operating frequencies are further restricted by the concept of counting one or more unit loads as a basis for determining when to operate the bells. To achieve substantially improved furnace productivity through reduced gas loss and reduced bell seal wear, more efficient control is therefore required for the transport of charge materials to the top of a blast furnace.

Summary of the invention

In accordance with the broad principles of the present invention, a charging control for a blast furnace comprises means for controlling a charge material handling and transport system and small and large furnace bells so that a preselected furnace charging pattern is effected and so that preselected weights of preselected materials are charged into the furnace. Further, means are provided for detecting the volume of material supplied to the furnace by the handling and transport system.

In meeting charge weight and pattern specifications, the material handling and transport and bell controlling means responds to the volume detecting means to supply and operate the small bell on the basis of a preselected volume of loading and to operate the large bell on the basis of another preselected volume of loading. Reduced or relatively optimally small frequency of small and large bell operation and improved productivity are thereby made possible for a particular size small bell capacity. Further, in new or reconstructed furnaces, the small bell capacity can be made relatively large to the extent furnace space allows, and, with volume loading control of the small bell operation by the controlling means, even further reduction in frequency of small bell operation and further improvement in productivity are made possible.

It is therefore an object of the invention to provide a novel blast furnace charging control which enables improved furnace productivity and efficiency to be achieved.

Another object of the invention is to provide a novel blast furnace charging control which provides more efficient bell operation based on bell volume loading.

A further object of the invention is to provide a novel blast furnace charging control which results in less frequent bell operations.

An additional object of the invention is to provide a novel blast furnace charging control which reduces bell seal wear and thereby extends bell seal life.

It is another object of the invention to provide a novel blast furnace charging control which enables productivity gain to be realized with the use of a larger capacity small bell when such gain would not be feasible with conventional blast furnace controls.

It is a further object of the invention to provide a novel blast furnace charging control which enables charging equipment to be used more efficiently.

Another object of the invention is to provide a novel blast furnace charging control which enables charging to be produced more continuously.

These and other objects of the present invention will become more apparent upon consideration of the following detailed description along with the attached drawings.

Description of the preferred embodiment

Figure 1:
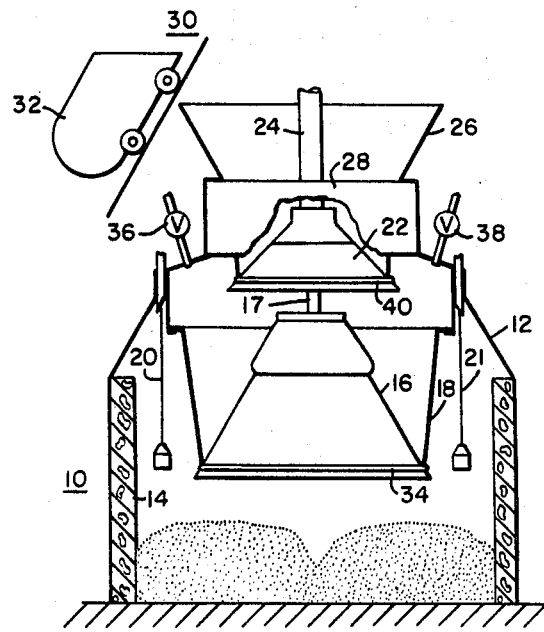
FIGURE 1 illustrates by a cut-away view the top of a typical ironmaking blast furnace.

More specifically, there is shown in FIG. 1 a top portion of a typical ironmaking blast furnace 10 having a casing 12 and an interior lining 14. A large bell 16 formed from a material such as steel is operated by a shaft 17 to control the dumping of material from a large-bell hopper 18 into the furnace body. Conventional stock rods 20 and 21 are lowered into the furnace body from time to time to detect the burden level and thereby produce data used in controlling the furnace charging operation.

Above the large bell 16, a small bell 22 formed from a material such as steel is operated by a shaft 24 to control the dumping of material from a small bell hopper 26 into the large bell hopper 18. A revolving distributor 28 is operable to control the buildup of charge material at various angular positions on the large bell 16. As a result, the charge material can be distributed on the large bell 16 for introduction into the furnace burden with a spiraling effect.

Charge material is transported to the furnace top by a material handling and transport system 30 including a skip hosit system with cars 32 which dump material into the small bell hopper 26. Other material handling and transport systems such as those which include a conveyor transport system (not shown) can be employed with the present invention.

Large bell sealing is produced by an annular composition type seal member 34 disposed about the periphery of the large bell 16 for contact with the large bell hopper wall. Clean gas pressure is controlled within the large bell hopper 18 by an equalizer valve 36 to minimize furnace top gas leakage through the region of the seal 34 when the large bell 16 is closed and to minimize furnace top gas flow into the large bell hopper 18 when the bell 16 is operated for dumping.

A relief valve 38 preferably reduces the clean gas pressure in the large bell hopper 18 when the small bell 22 is operated in order to minimize clean gas leakage to the exterior. A small bell seal 40 similar to the large bell seal 34 inhibits clean gas leakage to the exterior when the small bell 22 is in closed position.

As previously indicated, the small and large bell seals 34 and 40 become worn with repeated bell operations. When bell seal leakage becomes excessive as determined by operating management standards, the bell seals 34 and 40 must be replaced.

Figure 2:
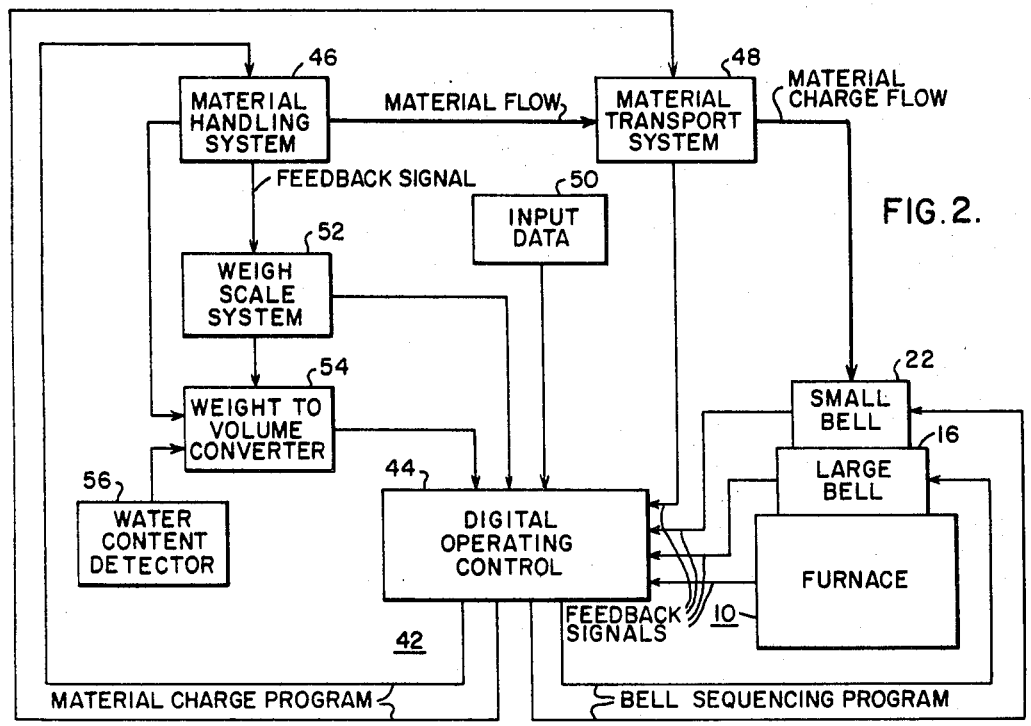
FIG. 2 shows a schematic diagram of a volume charging control arranged in accordance with the principles of the invention to control the charging of a blast furnace such as that shown in FIG. 1.

To increase bell seal operating life and furnace efficiency and productivity, a blast furnace charging control 42, shown in FIG. 2, operates in accordance with the principles of the present invention to provide for improved bell operation while maintaining required furnace process in thermal and chemical balance. The control 42 includes a digital operating control 44 and associated input-output devices, all of which can be provided in the form of a conventional small capacity digital computer system or in the form of a part of a conventional larger digital computer system.

In the alternative, the digital operating control 44 and associated control system elements can be in the form of special digital or digital-analog circuitry arranged or wired to perform the logic and other functions necessary or desirable in implementing the invention. In some cases, it might be desirable to utilize circuitry which would be characterized as fully analog. Since the specific hardware form of the control system elements is somewhat variable, the control 42 will be described only from a generalized standpoint.

The controlled equipment includes a material handling system 46 such as suitable charge material storage bins, feeder devices, weigh hoppers, etc. The controlled equipment further includes a material transport system 48 such as the skip hoist system noted in connection with FIG. 1, and furnace top small and large bells which are designated by the same respective reference characters 22 and 16 used in FIG. 1.

Generally, the digital operating control 44 is supplied with data from one or more input devices 50 such as a teletypewriter which defines the volume capacity of the small and large bells 22 and 16 and the pattern or sequencing and quantity of charging material needed for balanced furnace operation, i.e., to achieve hot metal, slag and gas products with specified endpoint conditions. When a digital computer system is employed, a software material charge program is entered into the computer memory and it is executed as required to maintain the preselected furnace burden level as monitored by stock rod originated feedback signals to the digital operating control 44 or computer. When executed, the material charge program effects delivery of successive skip car loads of materials in the preselected pattern to the small bell hopper. In the alternative to software programming, wired logic or combined wire and software logic can be used to provide the material charge program depending on the selected hardware.

A bell sequencing program is also employed in the digital operating control 44 to provide ultimate control of the small and large bell operations which are confirmed by feedback signals as indicated in FIG. 2. In providing such control, the bell sequencing program is coordinated with the material charge program to assure nonconflicting skip hoist and small bell operations. Bell operations occur on the basis of volume loading thereby increasing bell seal life and furnace efficiency and productivity as compared to that obtainable with conventional unit weight charge controls. Improved furnace efficiency and productivity stem from reduced bell seal wear and from more continuous charging and more efficient charging system operation all of which in turn stem from application of the invention. More charging continuity and efficiency are achieved by reduced total waiting time for bell dumping or opening resulting particularly from less frequent bell operation.

As each full or small skip car load is delivered to the small bell 22 a conventional weigh scale system 52 measures and signals the weight of the material in the car load. Successive weight signals corresponding to successive bell delivery loads are applied to a weight to volume converter 54 where conversion to successive volume signals is effected. In this instance, a suitable signal from the material handling system identifies the type of material (such as coke, iron ore, sinter, limestone, etc.) associated with each weight signal. Density information stored in the converter 54 is thus identified for each weight signal to make the volume conversion possible.

Preferably, a suitable real time water content detector 56 or other suitable water content data input apparatus also signals the converter 54 to provide correction for the stored density data pertaining to porous materials such as coke, which can have relatively widely varying water content depending on environment conditions. With the use of a digital computer system, the weight to volume converter 54 can be embodied in the computer and the water content detector 56 can be a separate real time input device for the computer or it can be replaced by a manual data input through the input data device 50.

Successive volume loading signals are operated upon by the bell sequencing program in calculating the accumulated volume loading of the small bell hopper. Preferably, the small bell 22 is dumped when its loading reaches an optimum value as defined by maximum small bell volume loading or some lesser volume loading based on operating management desired constraints such as (1) specified operating burden level will be reached with less than maximum small bell loading, (2) a skip car sequence has just been completed and furnace burden level does not justify and would not allow completion of a new skip car sequence, (3) some material handling problem will temporarily delay additional skip car deliveries, (4) large bell optimum loading requires only a partial small bell load, etc.

In effecting small bell optimum loading, the bell sequencing program accumulates the volume of actual material buildup in the small bell hopper and compares the accumulated value with the stored small bell volume capacity or some lower limit volume value if applicable. If the difference between the specified optimum small bell load and the accumulated load volume does not allow delivery of an additional full car load of the material next defined in the charging pattern, an output signal is preferably generated by the digital operating control 44 to the material handling system 46 to identify the weight of the next scheduled material required to fill the remaining unoccupied small bell volume. A partially filled skip car then effects delivery of the amount of material required for the optimum small bell volume load. To minimize partial car load deliveries, the small bell hopper is preferably provided with a volume capacity slightly greater than the capacity of the employed skip cars multiplied by an integral number.

After each optimum volume loading of the small bell 22, the skip hoist car operation is temporarily halted as the material carried by the small bell 22 is dumped into the large bell hopper. The known volumes of the dumped material from successive small bell dumps are accumulated and the large bell dumping is preferably effected when its loading reaches an optimum value as defined by maximum large bell volume loading or some lesser volume loading based on operating management desired constraints such as (1) specified operating furnace burden level will be reached with less than maximum large bell loading, (2) a skip car sequence has just been completed and the furnace burden level does not justify and would not allow completion of a new car sequence, (3) some material handling or material transport delay warrants dumping at less than maximum loading, etc.

Similar to the case of partial skip car deliveries under small bell volume loading control, a partial small bell load may be required from time to time to effect optimum large bell volume loading. In that event, execution of the bell sequencing program can be made to reflect this constraint on small bell operation. To minimize partial small bell dumping, the large bell hopper is preferably provided with a volume capacity slightly greater than the small bell voume capacity multiplied by an integral number.

As bell sequencing is volume load controlled, the weights and pattern of materials delivered to the furnace are made to conform to the specified input data on quantities and patterns of charge materials required. Thus, in effecting improved furnace charging control, the volume loading control 42 governs the manner in which material is charged into the furnace to meet charging weight and pattern specifications.

Signals from the weigh scale system 52 are preferably coupled directly to the digital operating control 44 as well as the weight to volume converter 54 in order to provide for comparing the actual delivered weights against ordered weights and for confirming delivery in accordance with the specified pattern. Delivery confirming feedback signals can also be supplied to the digital operating control 44 from the material transport system 48. Since the furnace operation is substantially continuous, the weights of supplied materials never quite reach specified supply requirements during the continuous batching operation since new requirements are periodically being supplied through the input data device 50. Continuous confirming of actual charging of material weights in conformity with continuing specifications does assure the furnace operating management that the charging process is being properly operated for chemical and thermal balance in the ironmaking operation.

As a result of use of the present invention, reduced bell seal wear and improved furnace efficiency and productivity are realized in blast furnaces. These benefits are realized when the invention is employed with the described skip hoist transport system as well as conveyor or other transport systems.

The foregoing description has been presented only to illustrate the principles of the invention. Accordingly, it is desired that the invention not be limited by the embodiment described, but, rather, that it be accorded an interpretation consistent with the scope and the spirit of its broad principles.

What is claimed is:

1. A charging control for a blast furnace having small and large bells subject to dumping operation and further having a material handling system and a material transport system associated therewith, said charging control comprising means for controlling the amounts and sequencing of preselected materials carried by the material handling and transport systems in successive loads to the small bell, means for detecting the volume of each of the material loads transported to the small bell, and means responsive at least to the detected volume data for operating at least the small bell in accordance with predetermined small bell volume loading criteria.

2. A charging control as set forth in claim 1 wherein said operating means also operates the large bell in accordance with predetermined large bell volume loading criteria.

3. A charging control as set forth in claim 2 wherein predetermined optimum small and large bell volume loadings are normally respectively employed as the small and large bell volume loading criteria.

4. A charging control as set forth in claim 3 wherein predetermined optimum small and large bell volume loadings are respectively defined under predetermined operating conditions as maximum small and large bell volume loadings.

5. A charging control as set forth in claim 1 wherein at least said operating means is in the form of digital control means.

6. A charging control as set forth in claim 1 wherein said volume detecting means includes a weigh scale system and means responsive to said weigh scale system for converting weight determinations into volume determinations.

7. A charging control as set forth in claim 1 wherein means are provided for enabling said controlling means and said operating means generally to maintain a predetermined burden level within the furnace.

References Cited

UNITED STATES PATENTS

| | | | |
|---|---|---|---|
| 2,773,610 | 12/1956 | Mohr et al. | 214—19 |
| 2,962,175 | 11/1960 | Fath et al. | 214—19 |
| 3,237,785 | 3/1966 | Holmes et al. | 214—19 X |

ROBERT G. SHERIDAN, Primary Examiner

U.S. Cl. X.R.

214—18.2, 37